(12) United States Patent
Blennerhassett et al.

(10) Patent No.: US 7,480,694 B2
(45) Date of Patent: Jan. 20, 2009

(54) WEB PLAYLIST SYSTEM, METHOD, AND COMPUTER PROGRAM

(75) Inventors: John Stewart Blennerhassett, Christchurch (NZ); Wayne John Parker, Blenheim (NZ); Alistair Hugh Munro, Christchurch (NZ)

(73) Assignee: Aspiring Software Limited, Ferrymead, Christchurch (NZ)

( * ) Notice: Subject to any disclaimer, the term of this patent is extended or adjusted under 35 U.S.C. 154(b) by 756 days.

(21) Appl. No.: 10/917,689

(22) Filed: Aug. 13, 2004

(65) Prior Publication Data
US 2005/0086606 A1   Apr. 21, 2005

(51) Int. Cl.
*G06F 15/16* (2006.01)
(52) U.S. Cl. ........................ 709/203; 709/202; 709/224; 709/245; 709/250
(58) Field of Classification Search .................. 709/202, 709/203, 224, 245, 250
See application file for complete search history.

(56) References Cited

U.S. PATENT DOCUMENTS

| | | | |
|---|---|---|---|
| 5,809,250 A | 9/1998 | Kisor | 395/200 |
| 5,951,643 A | 9/1999 | Shelton et al. | 709/227 |
| 6,035,332 A | 3/2000 | Ingrassia, Jr. et al. | 709/224 |
| 6,052,730 A | 4/2000 | Felciano et al. | 709/225 |
| 6,189,024 B1 | 2/2001 | Bauersfeld et al. | 709/203 |
| 6,195,679 B1 | 2/2001 | Bauersfeld et al. | 709/203 |
| 6,418,471 B1 | 7/2002 | Shelton et al. | 709/227 |
| 6,633,316 B1 * | 10/2003 | Maddalozzo et al. | 715/854 |
| 6,665,710 B1 * | 12/2003 | Bates et al. | 709/217 |
| 7,020,082 B2 * | 3/2006 | Bhagavath et al. | 370/230 |
| 2002/0038388 A1 | 3/2002 | Netter | 709/318 |
| 2002/0112013 A1 * | 8/2002 | Walsh | 709/206 |
| 2003/0028427 A1 * | 2/2003 | Dutta et al. | 705/14 |

FOREIGN PATENT DOCUMENTS

| | | |
|---|---|---|
| EP | 0 779 586 B1 | 8/2002 |
| WO | WO 00/60486 | 10/2000 |

\* cited by examiner

*Primary Examiner*—Michael Won
(74) *Attorney, Agent, or Firm*—Woodcock Washburn LLP

(57) ABSTRACT

A system, method, and computer program selectively capture a re-playable sequence of web pages. In one form, the system comprises an internet browser comprising a plurality of network addresses maintained in computer memory, the network addresses representing a sequence; at least one browser window configured to display to a user at least one web page identified by one of the network addresses; and a playlist engine configured to retrieve successive network addresses from the sequence and to display, in the browser window, web pages corresponding to the network addresses.

33 Claims, 9 Drawing Sheets

FIGURE 3

| Header: | | |
|---|---|---|
| Tag ID | Description | Example Text |
| [name] | Q Name as appears in pageQ Editor tree list root node entry. | Weather |
| [vers] | Release ID of program that created this Q | 1.0 |
| [vlsp] | Version (Home / Pro / Business) of program that created this Q. (L=Home, S=Pro, P=Business). | L |
| [date] | Date Q originally created in YYYYMMDD format | 20040520 |
| [auth] | Authors name as entered into the Q Properties dialog "Author" field. | wp |
| [pwrd] | Password name as entered into the Q Properties dialog "password" and confirm password fields. (NB:encrypted) | H25JHF5 |
| [orgz] | Organization name as entered into Q Properties dialog "Organization" field. | Aspiring Software Ltd |
| [mail] | Email ID as entered into Q Properties dialog "EMail" field. | |
| [webs] | Web site as entered into Q Properties dialog "Web site" field. | www.pageQ.com |
| [catg] | Q interest Category as entered into Q Properties dialog "Category" field | |
| [keyw] | Relevant Q keywords as entered into Q Properties dialog "Keywords" field | |
| [inst] | Display htmlQ user instructions block on title page flag (T=display, F=hide). | T |
| [loop] | Loop flag - set Q to auto repeat (during Play mode: on completion, return to title page and restart playing Q) (T=loop, F=stop on completion of Play sequence) | F |
| [timr] | Index of "Default Duration for Q" selection value as entered in Q Properties dialog (0=5s, 1=10s, 2=15s, 3=30s, 4=45s, 5=1m, 6=1m15, 7=1m30s, 8=1m45s, 9=2m, 10=2m15, 11=2m30s, 12=2m45s, 13=3m, 14=4m, 15=5m. | 3 |
| [auto] | On open, enter Play mode (T=true, F=false) | F |
| [play] | On opening exported htmlQ html file, enter Play mode (T=true, F=false) | T |

FIGURE 7A

| | | |
|---|---|---|
| [note] | On viewing exported htmlQ html file, auto-pop message dialogs containing Q Item note flag. | F |
| [cttl] | Title / separator page Title text color in RGB text value (0-255 Red, 0-255 Green, 0-255 Blue) | 000000255 |
| [cath] | Title / separator page Authors Name text color in RGB text value (0-255 Red, 0-255 Green, 0-255 Blue) | 000128064 |
| [cprp] | Title / separator page Properties (Organization, Email, Web site, Category information) text color in RGB text value (0-255 Red, 0-255 Green, 0-255 Blue) | 000128064 |
| [cinf] | Title / separator page Note text color in RGB text value (0-255 Red, 0-255 Green, 0-255 Blue) | 000000000 |
| [cbck] | Title / separator page Background color in RGB text value (0-255 Red, 0-255 Green, 0-255 Blue) | 255255255 |
| | | |
| Q Item: (per item) | | |
| [titl] | Q item Tree List node Title text | Today's Weather |
| [addr] | Item page URL address / banner image URL (if [sepr] flag set to 'T') | www.pageQ.com |
| [idnt] | Tree list node indent level | 1 |
| [stat] | Tree node checkbox status (T=ticked, F=un-ticked) | T |
| [sepr] | Is page a separator (T=yes, F=no) | T |
| [bckg] | URL address of background graphic image | /weather.gif |
| [tile] | Tile background image flag (T=yes, F=no) | F |
| [durs] | Item Play duration index value (ref [timr] tag in Header section). | 4 |
| [durc] | User has overridden global item Play duration index value. (T=utilize user value, F=use global value) | F |
| [info] | Q Item user notes | Some notes etc. |
| [infm] | Q Item user notes (additional lines) | More note info. |
| | | |
| Terminator | | |
| [end] | End of marker | (No value) |
| | | |

FIGURE 7B

WEB PLAYLIST SYSTEM, METHOD, AND COMPUTER PROGRAM

CROSS-REFERENCE TO RELATED APPLICATIONS

The present application claims priority to New Zealand Application No. 527621, filed Aug. 15, 2003, which is hereby incorporated by reference in its entirety.

FIELD OF THE INVENTION

The invention relates to the field of network browsing and in particular to a system, method, and computer program for selectively capturing a re-playable sequence of web pages.

BACKGROUND OF THE INVENTION

Internet users typically use a program called an internet browser or simply browser to navigate the Internet and locate web content that is of interest to the user. Browsers are also often used for accessing web-page type resources on local intranets. Two well known browser programs are Microsoft Internet Explorer and Netscape Navigator.

To view a web site the user will typically enter a Uniform Resource Locator (URL) into the browser program. The URL acts as an Internet address and the browser will access the web page or network resource located at that address and make it accessible to the user, generally by displaying it in the browser window.

Users may also search for content of interest by using web directories, search engines and portals. A search will usually be performed using keywords and will return a list of hyperlinks to URLs for web pages returned in the search. Unfortunately this type of search will often return a lot of junk and a user will have to expend a lot of effort to find the web content they were actually looking for.

The tools provided on browser programs to store and categorize web pages that the user has visited are rudimentary at best and usually comprise a simple static list of addresses or URLs such as, for example, Internet Explorer "Favorites" or Navigator "Bookmarks". So once a user has completed their research, they have no way of storing their hard won list of useful sites apart from such a static list. There is also no way of sharing their playlist of useful sites. It also means there is no easy way to create a presentation of web pages displayed in real time.

Such static lists are limited in that there is no flow, commentary, or timing information associated with the list. They are also limited because accessing each site in the list is manual and cumbersome.

While systems have been proposed that would allow a user to record a browsing session in real time so that it can be slavishly replayed later, it would be useful to provide a system that allowed a user to selectively capture a sequence of web pages and/or other network resources and that would allow for flexible replay of the sequence via easy to use controls.

SUMMARY OF THE INVENTION

In broad terms in one form the invention comprises an internet browser comprising a plurality of network addresses maintained in computer memory, the network addresses representing a sequence; at least one browser window configured to display to a user at least one web page identified by one of the network addresses; and a playlist engine configured to retrieve successive network addresses from the sequence and to display, in the browser window, web pages corresponding to the network addresses.

In broad terms in another form the invention comprises an internet browser comprising a plurality of network addresses maintained in computer memory, the network addresses representing a sequence; at least one browser window configured to display to a user at least one web page identified by one of the network addresses; a playlist engine configured to retrieve successive network addresses from the sequence and to display, in the browser window, web pages corresponding to the network addresses; and a control panel enabling a user to select for display at least one of the web pages from the sequence.

In broad terms in another form the invention comprises a web page display system for use with an internet browser having a browser window configured to display to a user at least one web page identified by one of a plurality of network addresses, the system comprising a plurality of the network addresses maintained in computer memory, the network addresses representing a sequence; and a playlist engine configured to retrieve successive network addresses from the sequence and to display, in the browser window, web pages corresponding to the network addresses.

In broad terms in another form the invention comprises a web page display system for use with an internet browser having a browser window configured to a display to a user at least one web page identified by one of a plurality of network addresses, the system comprising a plurality of the network addresses maintained in computer memory, the network addresses representing a sequence; a playlist engine configured to retrieve successive network addresses from the sequence and to display, in the browser window, web pages corresponding to the network addresses; and a control panel enabling a user to select for display at least one of the web pages from the sequence.

In broad terms in another form the invention comprises a method of creating a sequence of network addresses for use with an internet browser having at least one browser window configured to display to a user at least one web page identified by one of the network addresses, the method comprising the steps of creating a data file having a header section; receiving one or more network addresses; creating, for each of the received network addresses, respective data items representing the network addresses; and adding each data item to the data file in a sequence.

In broad terms in another form the invention comprises a data file for use with an internet browser having a browser window configured to display to a user at least one web page identified by one of a plurality of network addresses, the data file comprising a header section; and a plurality of data items representing respective network addresses, the data items having a sequence.

In broad terms in another form the invention comprises a data file for use with an internet browser having a browser window configured to display to a user at least one web page identified by one of a plurality of network addresses, the data file comprising a plurality of data items representing respective network addresses, the data items having a sequence; and computer program code operable to generate a playlist engine configured to retrieve successive network addresses from the sequence and to display, in the browser window, web pages corresponding to the network addresses.

In broad terms in yet another form the invention comprises a data file for use with an internet browser having a browser window configured to display to a user at least one web page identified by one of a plurality of network addresses, the data file comprising a plurality of data items representing respective network addresses, the data items having a sequence; computer program code operable to generate a playlist engine configured to retrieve successive network addresses from the sequence and to display, in the browser window, web pages corresponding to the network addresses; and computer program code operable to generate a control panel enabling a user to select for display at least one of the web pages from the sequence.

In broad terms in yet another form the invention comprises a method of creating a data file for use with an internet browser having a browser window configured to display to a user at least one web page identified by one of a plurality of network addresses, the method comprising the steps of receiving one or more network addresses; creating, for each of the received network addresses respective data items representing the network addresses; adding each data item to the data file in a sequence; adding to the data file computer program code operable to generate a playlist engine configured to retrieve successive network addresses from the sequence and to display, in the browser window, web pages corresponding to the network addresses.

In broad terms in another form the invention comprises a method of creating a data file for use with an internet browser having a browser window configured to display to a user at least one web page identified by one of a plurality of network addresses, the method comprising the steps of receiving one or more network addresses; creating, for each of the received network addresses, respective data items representing the network addresses; adding each data item to the data file in a sequence; adding to the data file computer program code operable to generate a playlist engine configured to retrieve successive network addresses from the sequence and to display, in the browser window, web pages corresponding to the network addresses; and adding to the data file computer program code operable to generate a control panel enabling a user to select for display at least one of the web pages from the sequence.

In broad terms in another form the invention comprises a method of displaying a plurality of web pages identified by network addresses to a user comprising the steps of displaying at least one browser window to a user, the browser window configured to display at least one web page identified by one of the network addresses; retrieving successive network addresses from computer memory, the network addresses representing a sequence; and displaying, in the browser window, web pages corresponding to the network addresses.

BRIEF DESCRIPTION OF THE DRAWINGS

Preferred forms of the system and method of the invention will now be described with reference to the accompanying figures in which:

FIG. 3 shows one preferred embodiment of the invention, a user interface for an enhanced internet browser;

FIG. 7 shows a typical data file generated in accordance with the invention.

DETAILED DESCRIPTION OF ILLUSTRATIVE EMBODIMENTS

The invention is primarily embodied in the methodology described below as implemented on computing and network resources. The invention is also embodied in any software that implements the methodology of the invention and any system comprising a combination of hardware and software that implements the methodology of the invention.

Figure 1:
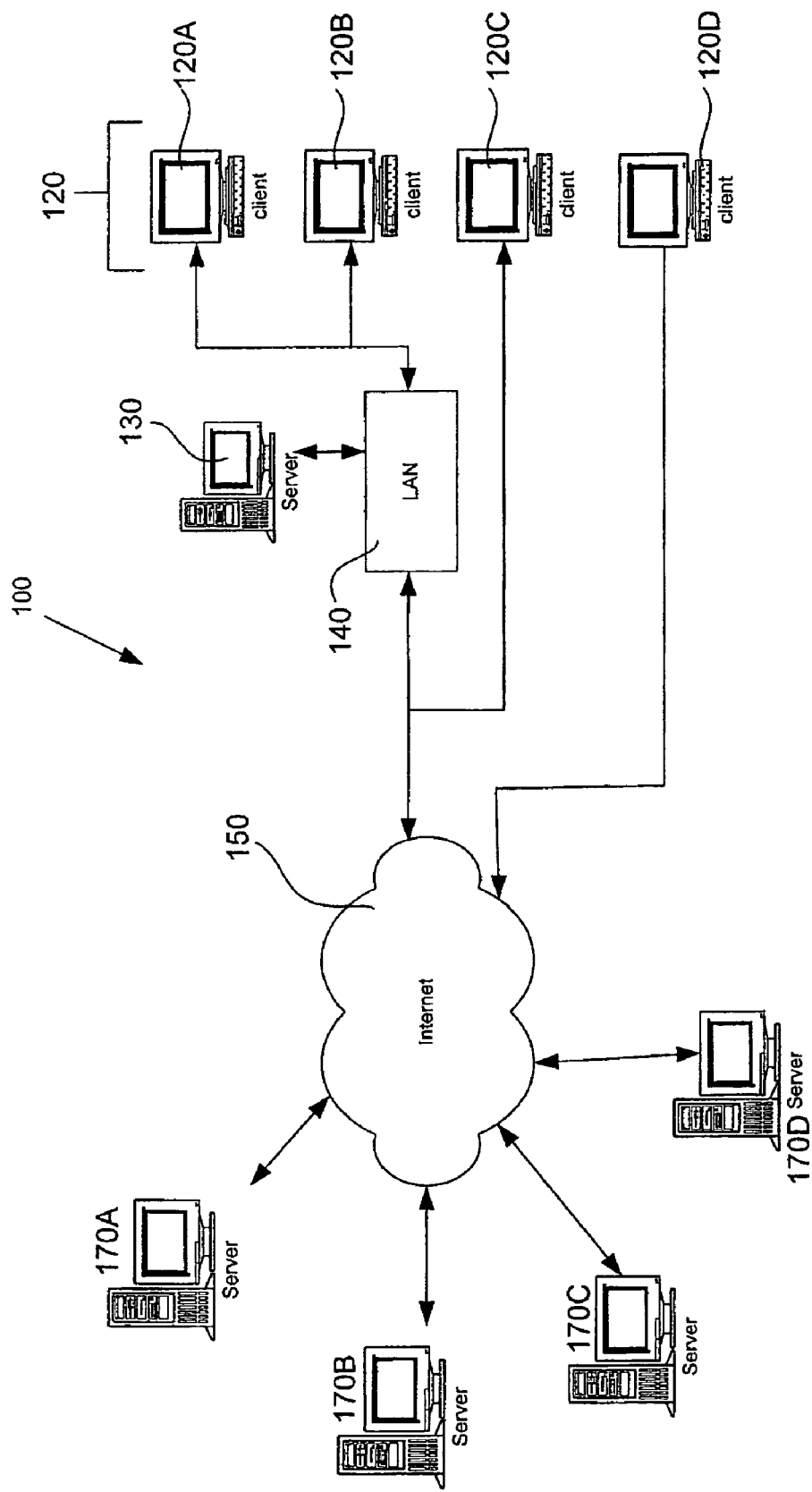
FIG. 1 shows a network arrangement on which web browsing would typically take place.

FIG. 1 illustrates a typical network arrangement 100 in which web browsing or navigation may take place. In this arrangement one or more clients 120, for example 120A, 120B, 120C, and 120D, each of which may comprise a personal computer, laptop, workstation, or handheld PDA as described below, or alternatively any computing device, access the Internet 150. It is envisaged that a client could be connected to the Internet through any combination of wired and/or wireless technology.

Each client 120 could be connected directly to the Internet, or could be connected through a local area network or LAN. Clients 120A and 120B for example are connected to a network 140 such as a local area network or LAN. The network 140 could be connected to a suitable network server 130 and access the Internet 150 as shown. Clients 120C and 120D are shown connected to the Internet 250 with a dialup, wireless, or other suitable connection.

Web servers 170 host web content, typically in the form of web sites comprised of linked HTML web pages. The web content hosted on the web servers 170 is accessible over the Internet 150. A web browser program is typically installed on client 120, enabling a client 120 to access web content and display it to a user using appropriate protocols. The typical functionality of web browser programs is well known in the art.

Figure 2:
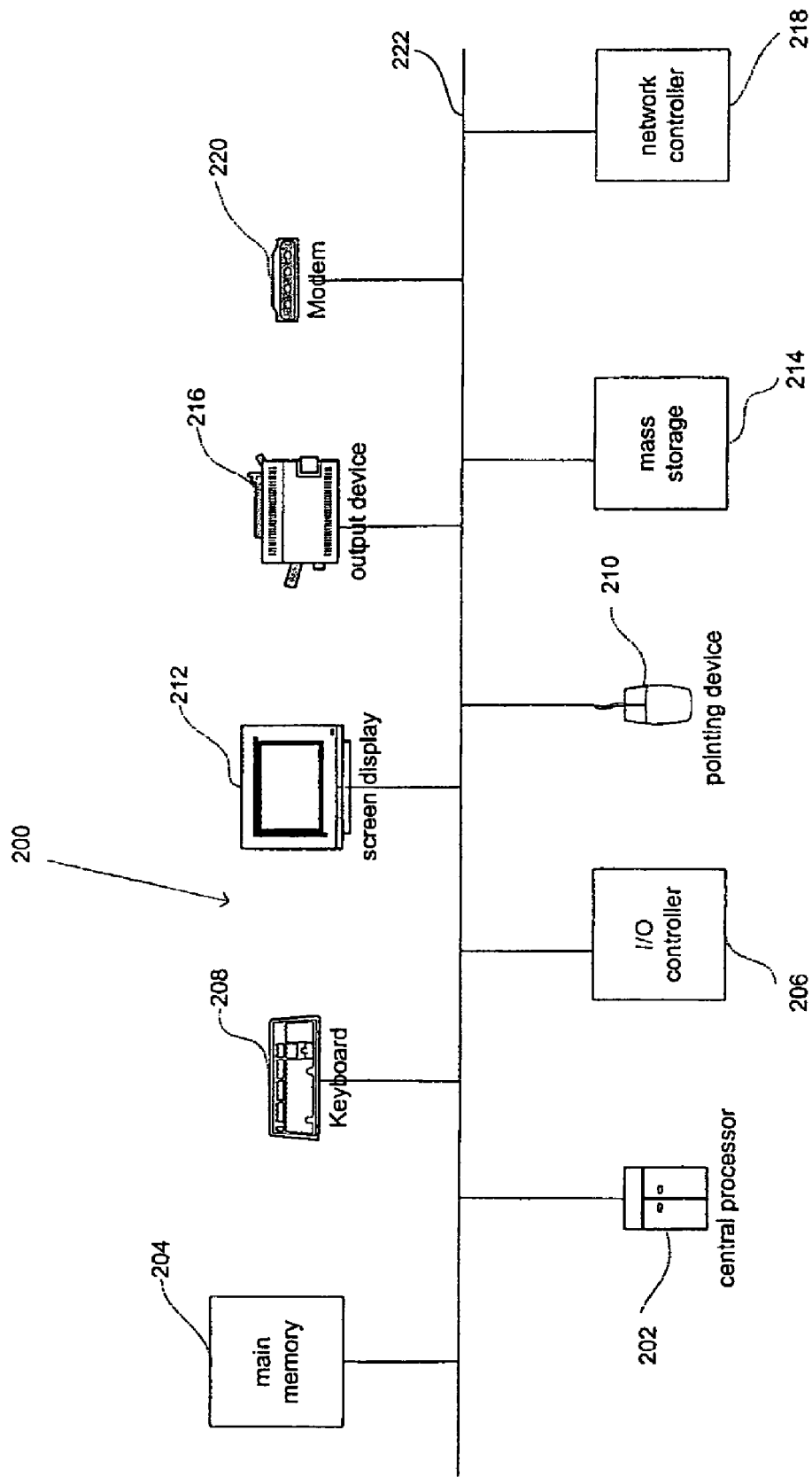
FIG. 2 shows a preferred configuration of hardware on which the invention may be carried out.

FIG. 2 shows a preferred system architecture of a computer system for preferred form client 120, and servers 130, 170. The computer system 200 typically comprises a central processor 202, a main memory 204 for example RAM, and an input/output controller 206. The computer system 200 also comprises peripherals such as, for example, a keyboard 208, a pointing device 210 for example a mouse, touchpad or track ball, a display or screen device 212, a mass storage memory 214 for example a hard disk, floppy disk or optical disc, and an output device 216 for example a printer. The system 200 could also include a network interface card or controller 218 and/or a modem 220. The individual components of the system 200 could communicate through a system bus 222.

In one embodiment the invention provides a computer program that performs all the usual functions of a browser but with additional functionality that implements the essential and preferred features of the invention. Usual functions of a browser could include forward, back, home, refresh, stop, new, open, save, save as, print, print preview, page setup, close, exit, recent file list, cut, copy, paste, undo, redo, find, select all, encoding, page source, page info, theme, full screen, synchronize, fill in form, toolbar, status bar, split, increase/decrease font, go, search, new window, cascade, tile, arrange, split, window list, help contents, help search, help wizard, tutorial, frequently asked questions, context help and history and favorites view, include, close and other options for configuring security, privacy, content, connections, programs, accessibility, browsing and multimedia. This program would be installed on a client 120 allowing a user to access web-sites and selectively capture a sequence of HTML pages or URLs for later playback and editing.

However, it is also envisaged that the invention could be embodied as a web based or server based application rather than a client based application as suggested above.

Figure 3:
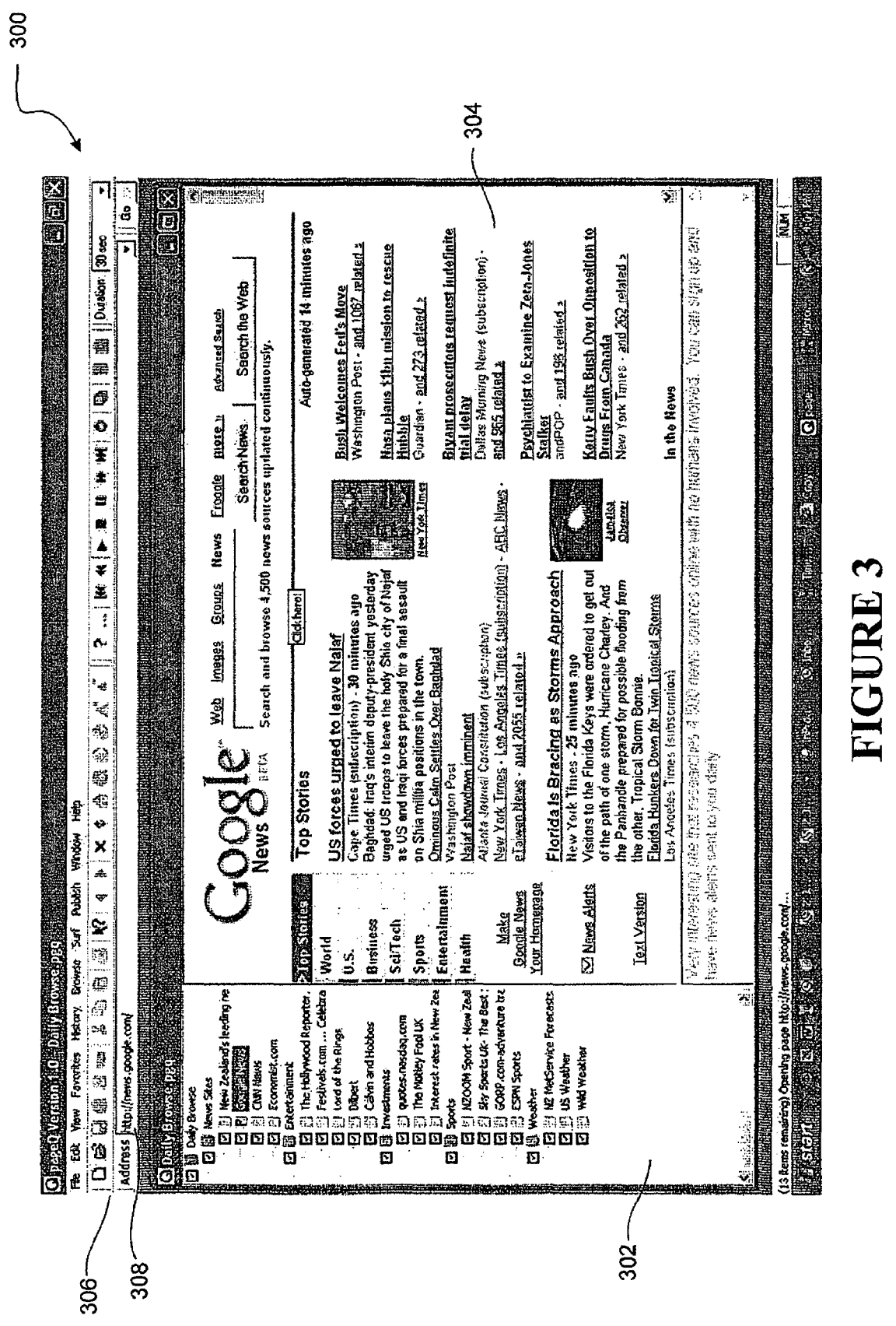

FIG. 3 shows one preferred embodiment of the invention. This preferred embodiment is a user interface 300 for a preferred form enhanced internet browser. The preferred form browser includes a plurality of network addresses maintained in computer memory. These network addresses could include uniform resource locators (URLs) indexing one or more internet web pages. These network addresses are maintained in computer memory and this computer memory could include, form part of, or be associated with client 120 from FIG. 1. The network addresses are stored as a sequence in computer memory and indexed so that successive network addresses from the sequence can be retrieved from computer memory.

As shown in FIG. 3 this sequence of network addresses could be displayed in a panel forming part of the user interface to the internet browser. This sequence of network addresses can be referred to as a "playlist".

The text displayed that identifies each network address could comprise the actual URL or alternatively a meaningful description linked to the network address could be displayed that is more meaningful to the user.

The internet browser includes at least one browser window 304 that is configured to display to a user at least one web page identified by one of the network addresses 302. In one preferred form internet browser a default is set that one browser window will be displayed to a user and that browser window displays the contents of one web page identified by one network address. It will be appreciated that the internet browser could generate and display a plurality of browser windows, each browser window configured to display to a user respective web pages each identified by respective network addresses. The internet browser could be configured to generate multiple browser windows automatically or on user selection.

The internet browser further comprises a playlist engine that is configured to retrieve successive network addresses 302 from the sequence and to display in the browser window 304 web pages corresponding to the network addresses. In one preferred form, the playlist engine is implemented as a software program or series of software functions and is not dissimilar to existing technology common to Internet Explorer and Navigator for retrieving URLs from computer memory, fetching web pages corresponding to those URLs from a remote web server or from a cached memory, and passing the retrieved data associated with the web page to a browser window for display.

The internet browser may further include a control panel 306 that enables a user to select for display at least one of the web pages from the sequence. The control panel in one form has functionality beyond the usual functionality of an internet browser and is described in more detail below.

It is envisaged that the internet browser includes further functionality common to an internet browser such as text box 308 that enables a user to enter or key in a URL manually. The URL is displayed in the text box, and the web page corresponding to the network address can be displayed in browser window 304. The user has the choice of including the displayed network address in the playlist.

As described above, one embodiment of the preferred form internet browser includes a control panel that enables a user to select for display at least one of the web pages from the sequence. Part of the control panel includes a set of buttons that enable a user to select a sequence of network addresses to be retrieved by the playlist engine.

Figure 4:
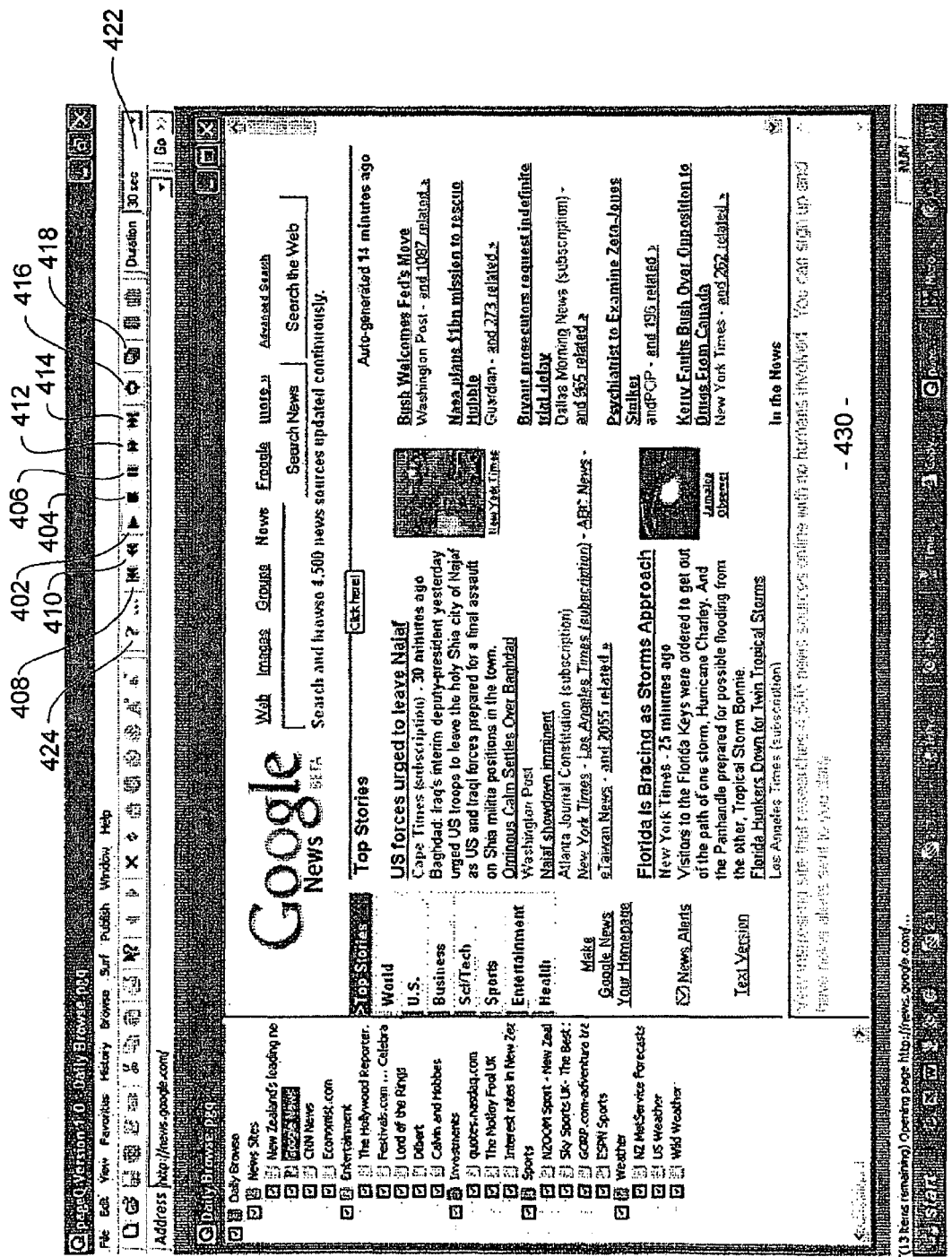
FIG. 4 is a preferred embodiment of the invention showing control panel aspects.

FIG. 4 shows a preferred form set of buttons to provide the required user control. Selecting the play button 402 causes the playlist engine to retrieve successive network addresses from the sequence and to display web pages in the browser window corresponding to these network addresses. The preferred form internet browser is capable of opening and replaying any saved playlist file. Alternatively the system could be configured to automatically retrieve successive network addresses from the sequence.

In one preferred form of the internet browser, those icons or buttons for the toolbar representing functions that are not required during a playlist sequence are "grayed out" and unavailable for user selection.

Playlist play back may be halted by the user pressing the stop button 404 and can be paused by the user pressing the pause button 406. The user may also select the "rewind" button 408 or the "previous" button 410 to return to the first or previous network address in the sequence respectively. The user may also select the "next" button 412 and the "go to end" button 414 to go to the next or last network address in the sequence respectively.

The control panel could also include a loop button 416. On user selection of the loop button, the sequence of network addresses are retrieved in turn by the playlist engine. Once the last network address is retrieved and displayed, the first network address in the sequence is then retrieved and displayed and so on.

The control panel could also include a launch all button 418 to invoke all network addresses of the current sequence, causing each to be retrieved by the playlist engine and corresponding web pages displayed in separate browser windows. It is envisaged that user selection of the launch all button causes a plurality of browser windows to be generated and displayed, and successive network addresses from a sequence are retrieved and web pages corresponding to those network addresses are displayed in respective browser windows. It is anticipated that the user, on selecting the launch all button 418 may receive a request for confirmation to proceed with this action, as the speed that this action can be completed will be dependent on the internet speed and bandwidth available to the user.

As shown in FIG. 4, the internet browser could also include a status bar 420. Once a network address has been retrieved from the sequence by the playlist engine, the corresponding web page is fetched from a remote web server or from cached memory. As various items of the web page are retrieved, they are displayed in the browser window. The status bar indicates the number of items remaining to be retrieved before being displayed in the browser window.

In one preferred form internet browser, the network addresses are associated with at least one duration value. This duration value represents a maximum time that a web page corresponding to that network address will be displayed in the browser window if in play mode. In other words, the playlist engine is configured to display at least one of the web pages corresponding to a network address having a duration value for a duration specified by that associated duration value.

It will be appreciated that there are several ways in which the network addresses could be associated with duration values. In one form, each network address could be associated with a single default value. For example, each network address could be associated with the duration value of 30 seconds. This would mean that during display of a playlist, each web page corresponding to stored network addresses will be displayed for 30 seconds in the browser window. The transition between web pages could be specified by the user when loading the next web page in the playlist sequence into the browser window.

In another form, the network addresses could each be associated with a default duration value. This default duration value could be duplicated and stored within or associated with each network address or a single global value could be stored that is applicable to at least one and preferably each of the network addresses. Where there is a single default duration value then one or more of the network addresses associated with the default duration value could have an item duration value specific for that network address that overrides the default duration value.

In a further preferred form at least one and preferably each of the network addresses could be associated with a specific item duration value.

Once all items have been retrieved and displayed in the browser window, the status bar 420 could indicate to a user the time remaining for the playlist engine to display a web page, in those circumstances where the network address corresponding to that web page is associated with a duration value. In this way the internet browser could include a timer configured to display, for example in the status bar 420, the time remaining for at least one of the displayed web pages, the time remaining for the playlist engine to display that web page.

The timer could be in the form of a countdown timer that displays how many more seconds the current web page will be displayed before the next web page associated with the next network address in the sequence begins loading. For example, if a duration value for a particular network address in the sequence is set to 30 seconds, then the timer will count down from 30 seconds and when the timer reaches 0, the playlist engine will retrieve the next network address in the sequence and reset the timer.

As shown in FIG. 4, the interface could include a duration box 422. The duration box shows the default duration value for a particular web page being displayed. The figure specified in the duration box can be manually overridden by the user.

The interface could also include a "more info" or "product info" button 424 that enables a user to obtain further information about a particular product or service. In one form the user selection of the more info button 424 could cause a further browser window to be opened and a relevant web page displayed in the browser window.

The internet browser could include a "preload" function configured to preload the web page associated with the next network address in the sequence in the background while the user is viewing the current web page during a playlist playback. In this way the playlist engine is configured to display the web page corresponding to a network address from the sequence while retrieving the web page or web pages corresponding to at least one subsequent network address in the sequence.

When a web page is first displayed in the browser window, the next network address in the sequence is selected. The web page referred to by the recently selected network address is assessed and downloaded to local data storage on the client device.

When the next web page in the sequence is to be displayed, due to a predefined timing of the sequence determining the next page should be displayed, or due to user input from the user manually choosing the next page using toolbar control buttons, the next web page is assembled from the locally stored content and displayed in the browser window.

It is envisaged that at least one subsequent network address in the sequence could be retrieved. In some circumstances, depending on the speed of the user's internet connection, it may be desirable to retrieve the next two, three or four network addresses from the sequence while viewing the web page for one of the network addresses.

The above steps are repeated until the last web page is displayed or until the user terminates the session. If it is detected that the next web page to be displayed in a sequence is no longer available, then an error message can be displayed if the browser attempts to access it. The preload function reduces delays in viewing web pages in the sequence and can enable early detection of web pages that are no longer available.

Figure 5:
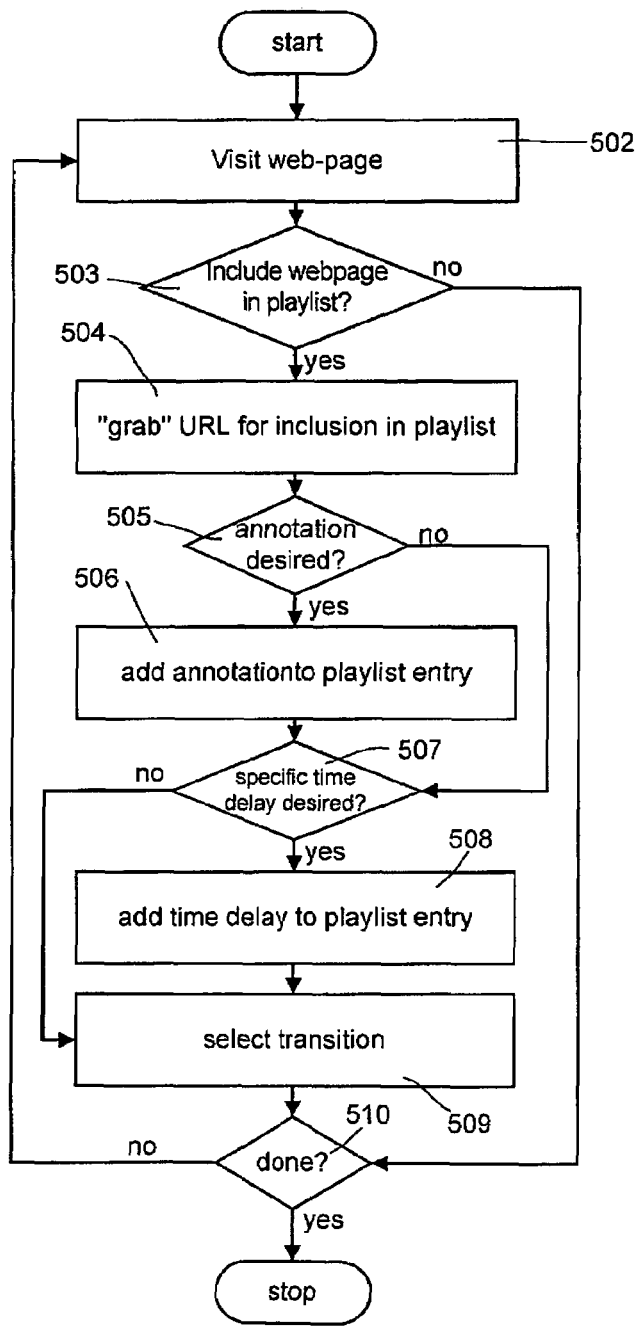
FIG. 5 is a flow diagram of a preferred method of capturing web-sites according to the invention.

FIG. 5 is a flow diagram of a preferred method by which the invention allows a user to construct a playlist. The preferred form method creates a sequence of network addresses known as a playlist for use with an internet browser. The browser has at least one browser window configured to display to a user at least one web page identified by one of the network addresses.

In one form a software program or software routine associated with the invention first creates a data file having a header section. This header section could be used to store specific data associated with the file. An example of a header section is described below.

The invention then receives one or more network addresses. In one form at least one of these network addresses could be selected by a user. In one embodiment, a user could browse a series of websites in the usual way, viewing web pages associated with particular network addresses in the form of URLs. The user could do this, for example, by typing a known URL into the text box.

When the user has accessed or visited an appropriate web page in a particular URL as shown at 502 in FIG. 5, the user then decides whether or not the user wishes to include the associated network address with that web page in the playlist or sequence of network addresses.

The user indicates at 503 whether or not the user wishes to include the network address with the web page. If the user does wish to include the web page, as indicated at 504, the user operates a user selection device for example a capture button to capture the web page for inclusion in the final resulting playlist file. In this way the method of the invention includes creating, for each of the received network addresses, respective data items representing the network addresses. These data items are then annotated as described below before being added to the data file in a sequence.

It is envisaged that any suitable means for selecting a network address could be implemented. For example, a user could select a URL hyperlink from a list of search results or from another web page. The user could also select a hyperlink from a document or email, or cut and paste the URL from another source into the address box.

In a further embodiment, the user could select a URL from an existing data file, for example a favorites or history folder maintained by the invention and by other known internet browsers. It is envisaged that an entire favorites or history data file could be imported directly into the sequence data file of the invention. A favorites/bookmark conversion utility could be used that takes a subset or all of the user's existing favorites or bookmarks as input and converts this data file into the data file of the invention as output.

In a further embodiment, at least one of the network addresses could be selected by a computer program. The invention could include a "page link crawler" function or computer program that is configured to crawl through a series of HTML pages and identify web page links. Network addressees corresponding to these web page links are then entered into the data file of the invention. The crawler could operate entirely independently from the user and simply crawl through random web pages. Alternatively, the user could enter a single web page or plurality of web pages in order to obtain a sequence of network addresses corresponding to that single or plurality of web pages.

The status bar 420 as shown in FIG. 4 preferably is configured to indicate to the user when the computer program of the invention is ready to capture playlist URLs, for example, by displaying the word "Done". Typically, the computer program of the invention will not be ready to record or capture URLs only when a page is loading into the browser window. While the page is loading, its progress is shown in the status bar and the capture function may be unavailable and the capture button greyed out.

In some cases a user that is also connected to a LAN, for example via clients 120A and 120B of FIG. 1, may navigate to a web page that is located on a local intranet rather than on the Internet. It is envisaged that local intranet pages may be captured by the playlist program of the invention in exactly the same way as a regular web page.

If the user wishes to add an annotation to the web page that they have captured, they may enter this in the text box 430 shown in FIG. 4 and as shown at step 506 in FIG. 5.

Typically an annotation would comprise text describing the web page or any other relevant comment. In its simplest form an annotation may serve as a user defined name for the web page.

It is envisaged that each web page captured could also be annotated with other types of media such as video, sound, and images, for example.

If the user wishes to enter a specific time delay 507 to the particular web page they have just captured defining the amount of time for which the page will be displayed when the playlist is replayed, then this must also be entered as shown at 508 in FIG. 5. The duration selected here would overwrite a default duration that can be set in a Properties section.

The user may also select 509 one or more transition effects, for example "fade" or "wipe". The selected transition effect will be applied between the web page just captured and the web page that follows in the playlist sequence.

If the user wishes to add more web pages 510 to the playlist, then the user will continue the process at 502. If the user has finished capturing URLs for the playlist then the user may elect to save the newly constructed playlist in a playlist file.

The invention will then create a new playlist file incorporating the sequence of web pages or URLs captured by the user and any other control information including, for example, time delays, transitions, and annotations/user defined names. The playlist file format could conform to HTML/XML standards as described below.

Where the internet browser includes a control panel, the control panel could include a series of buttons to enable a user to create a playlist.

The playlist file format will be associated with the playlist program so that playlist files may be immediately recognized by the operating system as needing to be opened by the computer program of the invention.

The playlist file format will also preferably include the variable fields author, title, date, organization, email, website, category and description/key words.

The playlist file will also preferably include password protection, preventing unauthorized editing.

Annotations entered by the user when the current page was captured will be displayed again in the text box.

Figure 6:
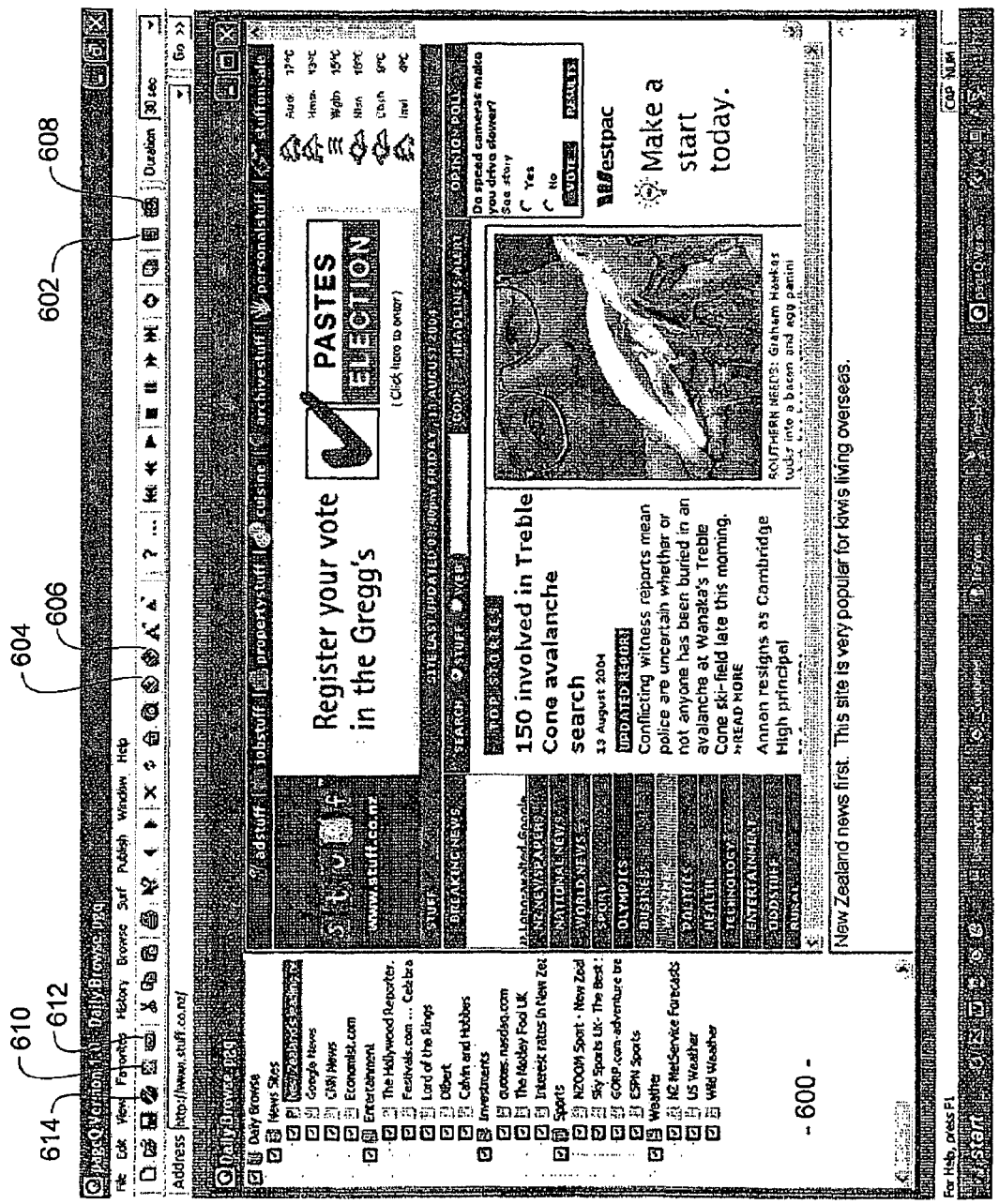
FIG. 6 shows the playlist user functions of the interface of FIG. 4.

Referring to FIG. 6, panel 600 displays the contents of the current playlist in a tree structure. This visual representation of the playlist is a useful reference and tool in both construction and playback of the playlist.

It is envisaged that the root node may be a title page. This title page may have a properties section where the creator can enter title, duration and references to banners and background images to appear on the title page. The user may also be able to control what information is displayed on the title page when the playlist is played. Optional separator pages may also be available for insertion into the playlist to aid structuring and any nesting in the playlist tree. The separator pages may have properties sections where the creator can enter title, duration and references to banners and background images to appear on the separator pages. The user may insert a separator page at a selected point in the playlist tree by using a Separator page button 602 as shown in FIG. 6.

It is envisaged a normal web page entry in the playlist will have a properties section where the creator can enter title, duration and URL of the web page to be displayed.

It is envisaged that the playlist may have a general properties section where the creator can enter author, title, date, organization, email, website, category, keywords, default duration, default colors, or selection of colors from a set of templates for the title page and separator pages and other optional information about the playlist. The general properties section will also allow the creator to specify additional information to be displayed on the title page such as user instructions, whether the playlist immediately begins playing when opened, and how the annotations are displayed.

It is envisaged the various properties sections may be accessed by right clicking with a mouse or other pointing device on the appropriate entry in the tree structure shown in panel 600.

The user may use a notes button to access the notes relating to the particular playlist entry. The user could use an information button to access further help and information regarding the system.

It is envisaged that there will be hotkeys, icons, and/or drop down menu items for all the important functions of the computer program of the invention.

In addition, the user may directly select a particular web page in the playlist that the user wishes to access by selecting the page from the playlist tree in panel 600, for example by clicking on it with a mouse or other pointing device.

When constructing a playlist, web page listings will be added to the playlist tree at the current position in the tree as they are captured during browsing. Prior to any web pages being captured an empty playlist tree will show only the root node with the same name as that given to the current playlist.

When the capture button is used the URL of the current web page will be inserted into the playlist tree at the current position. If preferred, the user may rename the web-page as it appears in the playlist tree, for example by double clicking on the URL in the playlist tree. The re-named playlist entry will still refer to the URL of the captured web page. Playlist entries may be structured and nested as described above.

A number of views of the playlist tree will be provided. The playlist can be viewed as a tree structure, tiles or thumbnails.

The playlist tree may also be used to edit the current playlist, if desired, by reordering, nesting and deleting web pages from the tree as desired. A playlist entry may be deleted, for example by selecting the entry and using the delete key. Entries may be re-ordered and parent-child relationships created by dragging and dropping playlist entries into new locations in the playlist tree.

It may also be possible to drag and drop URLs and playlist entries from other folders, menus and windows into the playlist tree. For example, it may be possible to drag and drop a web page reference from a "favorites" menu item or folder into the current playlist or to enter it into the playlist by double clicking on the favorites entry. A user's "favorites" may be accessed by, for example, clicking on the Favorites icon 604. It may also be possible to drag and drop a web page reference from a user's recent browsing history or to enter it into the playlist by double clicking on the history entry. A user's recent browsing history may be accessed by, for example, clicking on the History icon 606. It may also be possible to either drag and drop or cut and paste playlist entries between two or more open windows running the playlist computer program of the invention.

Once a user has selected a particular web page, and that web page has finished loading, that user may select a capture button to add the network address corresponding to that web page in the data file. A suitable capture button is indicated at 608.

The data file, known as a Q file, can be shared with other users provided that those other users have access to the software of the invention. The preferred form data file or Q file has a ".pgq" file extension and consists of ASCII text characters arranged in a sequence of tokens. The tokens typically comprise the format tag identifier, value, and new line character. The tokens are typically grouped into three sections, namely a header section, a data section including a series or plurality of data items representing respective network addresses known as Q items, and a terminating section.

Where a header section forms part of a data file, the header section could include the fields indicated in FIGS. 7A and 7B.

The data file of the invention includes a plurality of data items representing respective network addresses, the data items having a sequence within the data file. These individual data items are referred to as Q items in FIG. 7B.

The data file typically terminates with a terminator marker also indicated in FIG. 7B.

Where the network addresses are associated with one or more duration values, the header section could include a single default duration value, for example that shown in the tag identifier [timr] shown in FIG. 7A. Each data item could include a duration value overriding that shown in the header section as indicated by the fields [durs] and [durc] in FIG. 7B.

Also indicated in Appendix A is an example of a simple data file generated in accordance with the invention.

Preferably a user should be able to share playlists that they have created with other network users.

One way in which this can be done is by e-mail. If the user wishes to send a playlist to another network user that is using a client machine on which the playlist program of the invention is installed, then the user can simply send a standard proprietary playlist file described above to the other user as an attachment to an e-mail.

If, however, the user wishes to share a playlist with a user who does not have access to the playlist computer program of the invention, then the playlist may be saved as an HTML/javascript file rather than a proprietary playlist file type, for example, and sent as an e-mail attachment or by any other known means of transmission. In this case, a modified version of the computer program of the invention capable of being integrated with a standard browser may be automatically included in the attachment in compressed form, as described below.

The function of saving a playlist in HTML/javascript form may be accessed for example, via button 610 from FIG. 6. If a user wants to save only some entries in a current playlist, especially a particularly large playlist, to an HTML/javascript file then the user may use the include/exclude tickboxes in the playlist panel 600 to select a subset of the entries in the playlist before activating the save as HTML/javascript function via button 610.

A user may also be able to automatically create an e-mail with an HTML/javascript playlist file attached by using the publish to e-mail button 612. Users may be able to publish their playlists to the centralized web server via FTP. This function may be accessed for example, via button 614

The HTML/javascript playlist file will preferably conform to HTML/XML standards in a similar way to the proprietary playlist file type, or the HTML/javascript playlist file and the proprietary playlist file will be one and the same.

It is envisaged the HTML/javascript playlist file can be imported to the program for further editing.

The HTML/javascript playlist file format will be associated with normal Browser programs so that the HTML/javascript playlist may be immediately recognized by the operating system as needing to be opened by the default Browser, such as Microsoft's Internet Explorer or Netscape's Navigator.

As described above, the invention could be configured, in a further embodiment, to generate a data file for use with an internet browser that includes computer program code operable to generate a playlist engine configured to retrieve successive network addresses from the sequence and to display, in the browser window of the internet browser, web pages corresponding to the network addresses. This preferred form enhanced data file, referred to as "HTML Q" typically comprises standard HTML (hypertext mark up language) document directives while also incorporating extensive JavaScript defined variables, methods and objects that define the data item (Q) properties and provide the necessary user functionality.

Within the HTML Q file structure is contained all Q item title text, URL addresses, Q item note information, together with required status information. This provides for a single document entity that can be emailed or FTPed without the requirement for secondary support documents that must be reconciled before viewing. External file references are limited to universal graphics images not specific to an individual HTML Q file.

The key to manipulation and display of this internal data is use of a dynamic HTML IFRAME object element and its associated properties and methods to directly assign text and URL information contained within JavaScript defined arrays and variables. While IFRAMES are normally utilized to create inline floating frames, the following code defines a named accessible form child level IFRAME that conforms to the browser window boundaries while allowing for the toolbar interface.

```
<form>
<body scroll="no" topmargin="0" bottommargin="0"
    leftmargin="0" rightmargin="0" marginwidth=0
    marginheight=0 onLoad="init( )">
...
...
<iframe name="pgf" frameborder=1 marginwidth=0 marginheight=0
scrolling="no" width="100%" height="95%">
</form>
</body>
```

Within this document structure, the IFRAME object methods allow HTML derived from information contained within the document forming the body of Separator and Title pages to be written directly to the browser interface via the document property i.e.

```
pgf.document.open( )
pgf.document.write('<html><body> ...
pgf.document.write('</body></html>')
pgf.document.close( )
```

In the case Q items referring to a external World Wide Web pages, the user provided URL address may be also assigned via the document property interface. This is achieved defining a secondary embedded IFRAME and providing the URL as the SRC parameter. i.e.

```
pgf.document.open( )
pgf.document.write('<html><body><iframe src="'")
pgf.document.write(url)
pgf.document.writeln('" frameborder=0 marginwidth=0 marginheight=0
scrolling="auto" width="100%"
height="100%"></iframe></body></html>')
pgf.document.close( )
```

IFRAME properties are also manipulated to provide the most appropriate scrolling status.

Function Reference

The perception of an interactive executable application environment featuring a toolbar containing buttons with mouse rollover and condition status indications is achieved using extensive JavaScript user input and timer event messaging processing.

Launch( )
Initiated on Toolbar user event "Launch All" button, this function iterates through item array variables and creates a new browser session window for all Q Items specifying a World Wide Web URL address.

nxt( )
Called as a result of Timer events while htmlQ is in play mode. Increments Q item index allowing the next page in Q sequence to be displayed.

WSCP( )
Displays pagQ product sales information in new browser window.

Open( )
Creates new browser session in a new window for displaying World Wide Web URL address.

win(url)
Sub function of Open( ).

dsp(url)
Creates embedded IFRAME of the display of Q item World Wide Web URL address.

Select(url)
Determines if Q Item is a World Wide Web URL address or a Title/Separator page and calls either dsp(URL) or the appropriate Title/Separator definition function (Sn with n=Q invex numeric value.

sts(msg)
Displays text message (msg) in browser status bar area.

About( )
Displays product 'About' information located on the www.pageQ.com website. Information includes current release, version and feature updates.

Details( )
Displays in a Message Dialog, Q item additional information as entered in the pageQ Editor Notes area.

First( )
Initiated on Toolbar user event "Rewind" button. Sets Q Index to 0. Loads first Q item.

Previous( )
Initiated on Toolbar user event "Previous" button. Sets Q Index to current item −1. Loads previous Q item.

Next( )
Initiated on Toolbar user event "Next" button. Sets Q Index to current item +1. Loads next Q item.

Last( )
Initiated on Toolbar user event "Next" button. Sets Q Index to current item +1. Loads next Q item.

Play( )
Initiated on Toolbar user event "Play" button. Calls nxt( ) (to increment Q item) and then invokes Delay( ) to initiate timers and commence Q play sequence.

Stop( )
Initiated on Toolbar user event "Stop" button. Resets both Q sequence and Status display update timers. Updates status line message to 'Stopped' and sets toolbar button states to 'Stop' profile.

Pause( )
Initiated on Toolbar user event "Pause" button. Resets both Q sequence and Status display update timers. Updates status line message to 'Paused' and sets toolbar button states to 'Paused' profile.

Loop( )
Initiated on Toolbar user event "Loop" button. Sets internal 'loop' flag to Boolean value 'true'.

msg( )
Called on Message Display Refresh Timer Event. Updates browser status bar to reflect current Q operation and if in 'Play' mode, update count-down timer.

Delay(d)
Resets and initializes both Q sequence and Status display update timers.

$Sn( )$ ($n=Q$ Title/Separator page index)

i.e. S0( ), S1( ), S6( ), . . .
Writes hard coded Q Item Title/Separator page HTML directly to the browser interface via document property methods. i.e.

```
pgf.document.open( )
pgf.document.write('<html><body> ...
pgf.document.write('</body></html>')
pgf.document.close( )
```

An example HTML Q file is shown in Appendix B.

Figure 8:
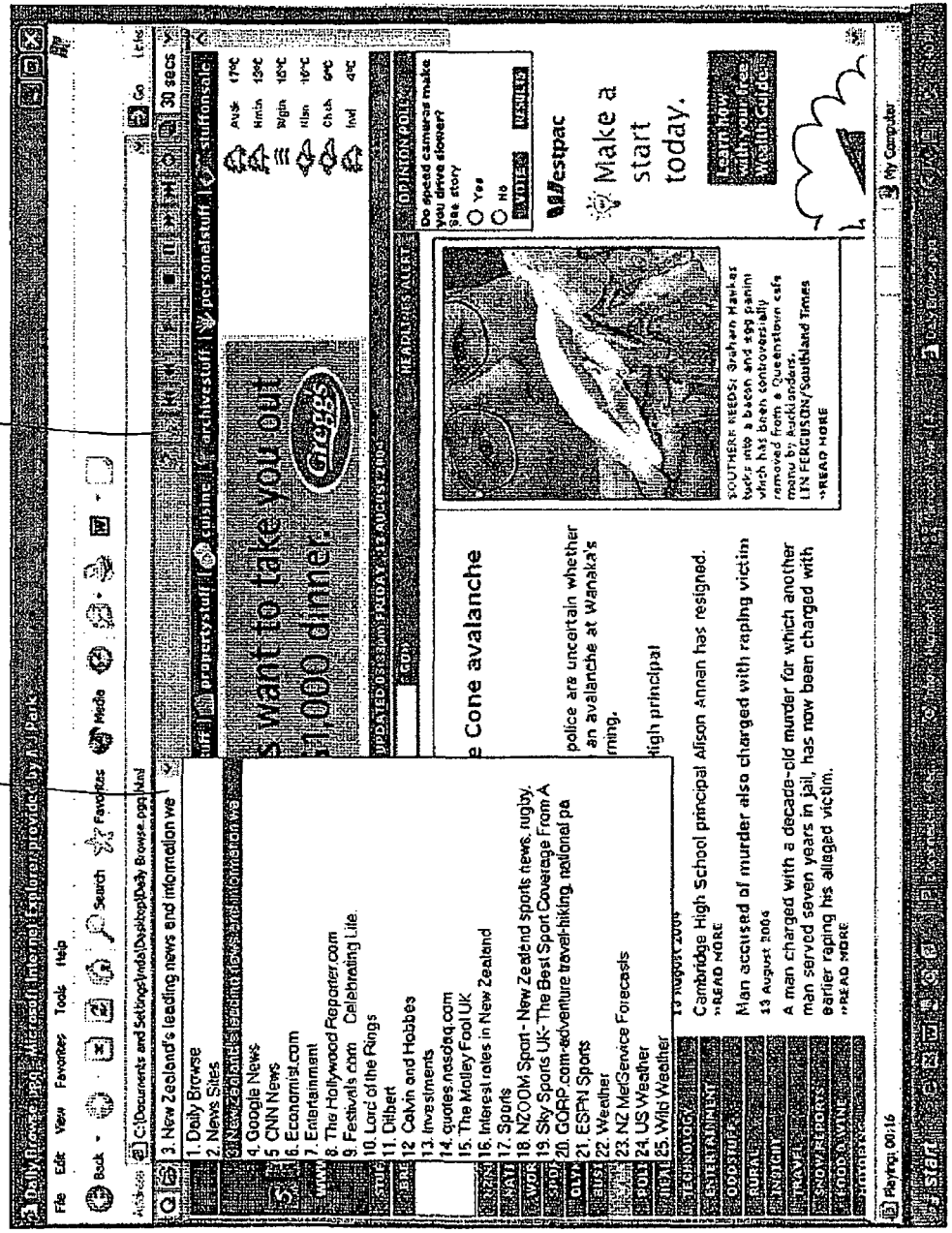
FIG. 8 shows an embodiment of the invention in the form of a data file incorporated with an internet browser, operable computer program and control panel.

It is envisaged that the invention could provide a browser integrated version of the playlist program. As shown in FIG. 8, the invention could be used with a conventional internet browser 800. A drop down list box 802, for example, may be used to view the playlist as an alternative to the tree structure representation. Users may navigate to individual pages in the drop down list by selecting them in the list box.

Preferably, as the playlist plays, the name associated with each page by the user who created the playlist will be displayed in a list box, while the URL address is shown in the address box of the browser and the web page itself is displayed in the browser window.

Annotations for each playlist entry may also be displayed in the modified computer program of the invention. This may be done, for example, as a pop-up function or an added frame at the bottom of the main frame in the browser window. The user interface could include a "notes" button 804. User selection of this button enables a user to edit the notes or annotations associated with a playlist item.

As an alternative to e-mail, users may share their playlists with other users by accessing a web-site that allows users to submit playlists to a directory on a centralized server for use by other users. The centralized server would allow other users to access playlists without the playlists needing to reside on each user's own client computer.

Web pages that are not available via the Internet or on the user's intranet may be stored in their entirety on the centralized server. Each playlist on the centralized server is preferably stored together with a brief 'synopsis' which explains the topic or purpose of the playlist.

Playlists in the directory may be retrieved by a search engine included on the web-site that searches the synopses and/or information entered by the creator into the title page for matching search arguments.

Users may also be able to rate or review playlists on the centralized server so that other users can get an idea as to how useful or informative a particular playlist is.

Users may also schedule a playlist to run on the PC at a prescribed time.

The ability to capture mouse movements and entry of text will be provided at 'record time' such that the user can record for example userids and passwords to be entered into a web page as part of the playlist. When the playlist is re-played at a later time, the entry of text will be recreated at the appropriate place in the playlist. Encryption of data will be provided.

It is envisaged that various versions of the system could be created with varying levels of functionality.

The foregoing describes the invention including preferred forms thereof. Alterations and modifications as will be obvious to those skilled in the art are intended to be incorporated within the scope hereof, as defined by the accompanying claims.

What is claimed:

1. A computer device executing an Internet browser comprising:
   at least one browser window configured to display to a user at least one web page identified by one of a plurality of network addresses in computer memory, said network addresses representing a sequence;
   a playlist engine configured to retrieve user selected network address(es) from the sequence, and further configured to display, in the browser window, web pages corresponding to the user selected network addresses; and
   a control panel configured to enable a user to select for display in the browser window(s) at least one of the web pages corresponding to the user selected network address(es), the control panel having a play mode control which when selected by the user causes the playlist engine to retrieve successive addresses from the sequence in the absence of user selection and to display in the browser window web pages corresponding to the retrieved successive addresses, the web pages each displayed for one or more predefined durations;
   wherein the network addresses are associated with one or more duration values, the predefined duration for each web page specified by the associated duration value; and
   further comprising a timer configured to display, for at least one of the displayed web pages, the time remaining for the playlist engine to display the web page.

2. A computer device executing an Internet browser as claimed in claim 1 wherein the network addresses are each associated with a single default duration value.

3. A computer device executing an Internet browser as claimed in claim 1 wherein the network addresses are each associated with a default duration value, and one or more of the network addresses are associated with an item duration value overriding the default duration value.

4. A computer device executing an Internet browser as claimed in claim 1 wherein one or more of the network addresses are associated with an item duration value.

5. A computer device executing an Internet browser as claimed in claim 1 wherein the playlist engine is configured to display the web page corresponding to a network address from the sequence while retrieving the web page(s) corresponding to at least one subsequent network address in the sequence.

6. A computer device executing an Internet browser as claimed in claim 1 wherein the playlist engine is further configured to retrieve the user selected network addresses from the sequence and to display the web pages corresponding to the network addresses in respective browser windows.

7. A web page display system for use with an Internet browser having a browser window configured to display to a user at least one web page identified by one of a plurality of network addresses maintained in computer memory, the network addresses representing a sequence, the system comprising:
   a playlist engine configured to retrieve user selected network address(es) from the sequence, and further configured to display, in the browser window, web pages corresponding to user selected network addresses: and
   a control panel configured to enable a user to select for display in the browser window(s) at least one of the web pages corresponding to the user selected network address(es), the control panel having a play mode control which when selected by the user causes the playlist engine to retrieve successive addresses from the sequence in the absence of user selection and to display in the browser window web pares corresponding to the retrieved successive addresses, the web pares each displayed for one or more predefined durations;
   wherein the network addresses are associated with one or more duration values, the predefined duration for each web page specified by the associated duration value; and
   further comprising a timer configured to display. for at least one of the displayed web pages, the time remaining for the playlist engine to display the web page.

8. A web page display system as claimed in claim 7 wherein the network addresses are each associated with a single default duration value.

9. A web page display system as claimed in claim 7 wherein the network addresses are each associated with a default duration value, and one or more of the network addresses are associated with an item duration value overriding the default duration value.

10. A web page display system as claimed in claim 7 wherein one or more of the network addresses are associated with an item duration value.

11. A web page display system as claimed in claim 7 wherein the playlist engine is configured to display the web page corresponding to a network address from the sequence while retrieving the web page(s) corresponding to at least one subsequent network address in the sequence.

12. A web page display system as claimed in claim 7 wherein the playlist engine is further configured, on user selection, to retrieve successive network addresses from the sequence and to display the web pages corresponding to the network addresses in respective browser windows.

13. A computer readable storage medium comprising a data file for use with an Internet browser having a browser window configured to display to a user at least one web page identified by one of a plurality of network addresses, the data file comprising:
   a plurality of data items representing respective network addresses, the data items having a sequence;
   computer program code operable to generate a playlist engine configured to retrieve user selected network address(es) from the sequence and, further configured to display, in the browser window, web pages corresponding to user selected network addresses; and
   computer program code operable to generate a control panel configured to enable a user to select for display in the browser window(s) at least one of the web pages corresponding to the user selected network address(es), the control panel having a play mode control which when selected by the user causes the playlist engine to retrieve successive addresses from the sequence in the absence of user selection and to display in the browser window web pages corresponding to the retrieved successive addresses, the web pages each displayed for one or more predefined durations;
   wherein the network addresses are associated with one or more duration values, the predefined duration for each web page specified by the associated duration value: and
   further comprising computer program code operable to generate a timer configured to display, for at least one of the displayed web pages, the time remaining for the playlist player to display the web page.

14. A computer readable storage medium comprising a data file for use with an Internet browser as claimed in claim 13 further comprising a header section.

15. A computer readable storage medium comprising a data file for use with an Internet browser as claimed in claim 14, wherein the header section includes a single default duration value from which the predefined duration is calculated.

16. A computer readable storage medium comprising a data file for use with an Internet browser as claimed in claim 14 wherein the header section includes a default duration value, and one or more of the data items including an item duration value overriding the default duration value, the predefined duration(s) calculated from the item duration value(s) and/or the default duration value.

17. A computer readable storage medium comprising a data file for use with an Internet browser as claimed in claim 13 wherein one or more of the data items includes an item duration value, the predefined duration(s) calculated from the item duration value(s).

18. A computer readable storage medium comprising a data file for use with an Internet browser as claimed in claim 13 wherein the playlist engine is configured to display the web page corresponding to a network address from the sequence while retrieving the web page(s) corresponding to at least one subsequent network address in the sequence.

19. A computer readable storage medium comprising a data file for use with an Internet browser as claimed in claim 13 wherein the playlist engine is further configured, on user selection, to retrieve successive network addresses from the sequence and to display the web pages corresponding to the network addresses in respective browser windows.

20. A method of creating a data file for use with an Internet browser having a browser window configured to display to a user at least one web page identified by one of a plurality of network addresses, the method comprising:
   receiving one or more network addresses;
   creating, for each of the received network addresses, respective data items representing the network addresses;
   adding each data item to the data file in a sequence;
   adding to the data file computer program code operable to generate a playlist engine configured to retrieve user selected network address(es) from the sequence, and further configured to display, in the browser window, web pages corresponding to the successive or user selected network addresses; and
   adding to the data file computer program code operable to generate a control panel configured to enable a user to select for display in the browser window(s) at least one of the web pages corresponding to the user selected network address(es), the control panel having a play mode control which when selected by the user causes the playlist engine to retrieve successive addresses from the sequence in the absence of user selection and to display in the browser window web pages corresponding to the retrieved successive addresses, the web pages each displayed for one or more predefined durations;
   wherein the network addresses are associated with one or more duration values. the predefined duration for each web page specified by the associated duration value: and
   further comprising displaying. for at least one of the displayed web pages, the time remaining for the web pages to be displayed.

21. A method of creating a data file for use with an Internet browser as claimed in claim 20 further comprising the step of adding a header section to the data file.

22. A method of creating a data file for use with an Internet browser as claimed in claim 21 wherein the header section includes a single default duration value from which the predefined duration is calculated.

23. A method of creating a data file for use with an Internet browser as claimed in claim 21 wherein the header section includes a default duration value, and one or more of the data items representing respective network addresses including an item duration value overriding the default duration value, the predefined duration(s) calculated from the item duration value(s) and/or the default duration value.

24. A method of creating a data file for use with an Internet browser as claimed in claim 21 wherein one or more of the data items includes an item duration value associated with the duration value(s), the predefined duration(s) calculated from the item duration value(s).

25. A method of creating a data file for use with an Internet browser as claimed in claim 20 wherein at least one network address is selected by a user.

26. A method of creating a data file for use with an Internet browser as claimed in claim 20 wherein at least one network address is obtained from a data file.

27. A method of creating a data file for use with an Internet browser as claimed in claim 20 wherein at least one network address is selected by a computer program.

28. A method of displaying a plurality of web pages identified by network addresses to a user, the method comprising:
displaying at least one browser window to a user, the browser window configured to display at least one web page identified by one of the network addresses;
retrieving user selected network address(es) from computer memory, the network addresses representing a sequence;
displaying a control panel to a user to enable the user to select for display in the browser window(s) at least one of the web pages corresponding to the user selected network address(es), the control panel having a play mode control;
retrieving, on user selection of the play mode control, successive network address(es) from the computer memory in the absence of user selection; and
displaying, in the browser window, web pages corresponding to the retrieved successive addresses for one or more predefined durations:
wherein the network addresses are associated with one or more duration values, and wherein the web pages corresponding to the network addresses are displayed for a duration specified by the associated duration value; and
further comprising displaying, for at least one of the displayed web pages, the time remaining for the web page to be display.

29. A method of displaying a plurality of web pages identified by network addresses to a user as claimed in claim 28 wherein the network addresses are each associated with a single default duration value.

30. A method of displaying a plurality of web pages identified by network addresses to a user as claimed in claim 28 wherein the network addresses are each associated with a default duration value, and one or more of the network addresses are associated with an item duration value overriding the default duration value.

31. A method of displaying a plurality of web pages identified by network addresses to a user as claimed in claim 28 wherein one or more of the network addresses are associated with an item duration value.

32. A method of displaying a plurality of web pages identified by network addresses to a user as claimed in claim 28 wherein the step of displaying web pages corresponding to the network addresses is performed while retrieving the web page(s) corresponding to at least one subsequent network address in the sequence.

33. A method of displaying a plurality of web pages identified by network addresses to a user as claimed in claim 28 further comprising, on user selection, of retrieving successive network addresses from the sequence and displaying the web pages corresponding to the network addresses in respective browser windows.

* * * * *

UNITED STATES PATENT AND TRADEMARK OFFICE
CERTIFICATE OF CORRECTION

PATENT NO. : 7,480,694 B2  Page 1 of 1
APPLICATION NO. : 10/917689
DATED : January 20, 2009
INVENTOR(S) : John Stewart Blennerhassett et al.

It is certified that error appears in the above-identified patent and that said Letters Patent is hereby corrected as shown below:

Title Page

Insert
--(30)   Foreign Application Priority Data
Aug. 15, 2003   (NZ)   ..........527621--.

Column 16, line 53, delete "pares" and insert --pages-- therefor.

Column 16, line 54, delete "pares" and insert --pages-- therefor.

Column 17, line 52, delete "14," and insert --14-- therefor.

Column 19, line 20, delete "display" and insert --displayed-- therefor.

Column 20, line 23, delete "of".

Signed and Sealed this

Twenty-third Day of March, 2010

David J. Kappos
*Director of the United States Patent and Trademark Office*